United States Patent [19]
Kuzdak, III

[11] Patent Number: 6,106,207
[45] Date of Patent: Aug. 22, 2000

[54] CAPTURED FASTENER FOR INSTRUMENT PANEL COVER PLATE

[75] Inventor: Andrew Kuzdak, III, Rochester Hills, Mich.

[73] Assignee: DaimlerChrysler Corporation, Auburn Hills, Mich.

[21] Appl. No.: 09/372,318

[22] Filed: Aug. 11, 1999

[51] Int. Cl.[7] ............................. F16B 21/18; F16B 39/00
[52] U.S. Cl. ..................... 411/107; 411/353; 411/533; 411/970; 411/999
[58] Field of Search .................................. 411/107, 352, 411/353, 355, 368, 533, 970, 999

[56] References Cited

U.S. PATENT DOCUMENTS

| | | |
|---|---|---|
| Re. 36,164 | 3/1999 | Johnson et al. . |
| 1,177,810 | 4/1916 | Rogness . |
| 1,927,780 | 9/1933 | Anderson . |
| 1,982,232 | 11/1934 | Place . |
| 2,010,853 | 8/1935 | Dyer . |
| 2,272,178 | 2/1942 | McDowell et al. .................. 411/999 X |
| 2,761,484 | 9/1956 | Stenick et al. . |
| 3,018,127 | 1/1962 | Dobrosielski . |
| 3,195,600 | 7/1965 | Middleton, Jr. ..................... 411/999 X |
| 3,339,952 | 9/1967 | Beckman . |
| 3,556,570 | 1/1971 | Cosenza .............................. 411/999 X |
| 3,737,972 | 6/1973 | Smoot . |
| 3,878,042 | 4/1975 | Curulla et al. ....................... 411/999 X |
| 5,093,976 | 3/1992 | Malinow et al. . |
| 5,256,019 | 10/1993 | Phillips, II . |
| 5,570,982 | 11/1996 | Lautenschlager .................... 411/999 X |
| 5,579,661 | 12/1996 | Yarnell et al. . |

Primary Examiner—Neill Wilson
Attorney, Agent, or Firm—Kenneth H. Maclean

[57] ABSTRACT

A cover plate for an instrument panel carrying a captured fastener adapted to be assembled to an underlying instrument panel support structure by a closely overlying and sliding motion of the cover plate relative to the support structure. The cover plate has a thickened boss portion formed with an internally threaded passage. The fastener has an elongated shank extending axially to the passage and includes an unthreaded mid-portion and a threaded outer end portion, terminating in a tip. A pre-assembly position of the fastener is attained by rotation of the fastener with respect to the boss's threaded portion just sufficent for supporting the fastener but not enough to advance the tip from within the boss thereby preventing the tip from projecting out from the surface of the cover plate. An assembled position or advanced position is attained by further rotating the fastener causing its threaded portion to engage the underlying instrument panel structure and leave the fastener's unthreaded mid-portion totally within the boss, free of any threaded engagement while the threaded end portion engages a C-clip supported on the instrument panel.

2 Claims, 2 Drawing Sheets

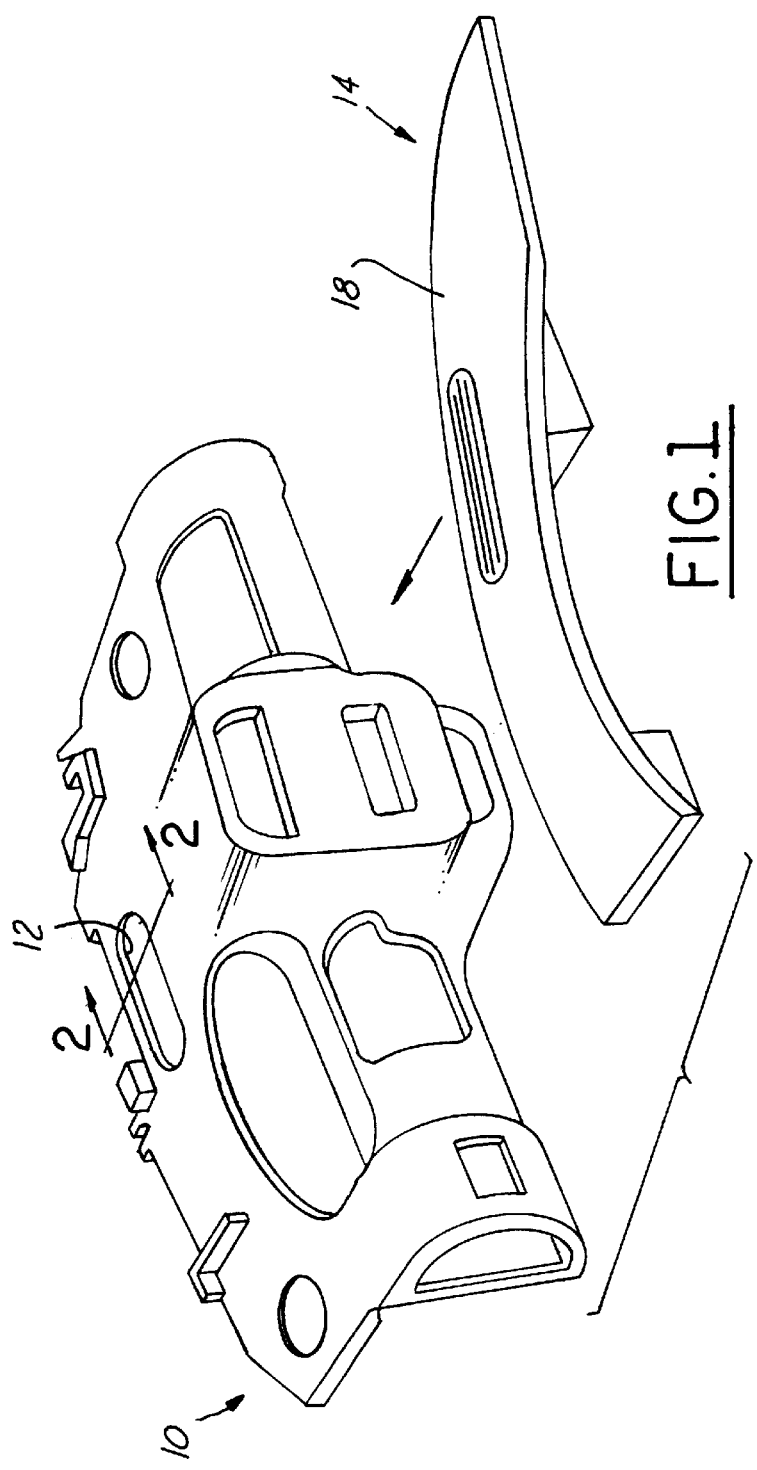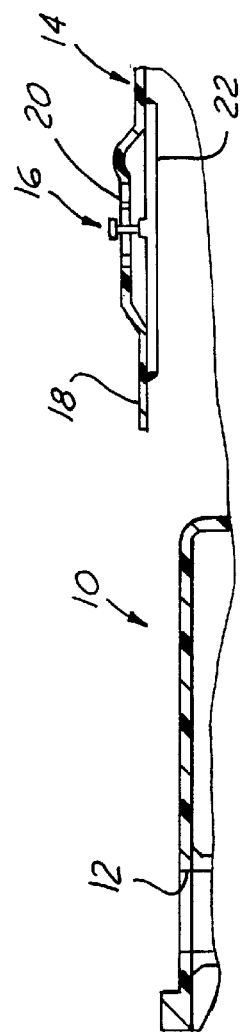
FIG.1
FIG.2

CAPTURED FASTENER FOR INSTRUMENT PANEL COVER PLATE

This invention relates generally to fastener assemblies, and more particularly to a captured fastener and cover plate adapted to be assembled to an underlying structure such as an instrument panel.

BACKGROUND OF THE INVENTION

If a member, such as an instrument panel cover plate, is to be attached by a fastener to a support structure, such as the base instrument panel, it is desirable for the fastener to be "captured" that is, retained on the cover plate member, so that the fastener is readily available when needed to effect the attachment. Current captured fastener technology includes the use of a "pal-nut" clip which retains a fastener to a cover plate. Typically, a cover plate member is moved during assembly into a desired position over the associated base instrument panel by a close sliding of the cover plate member along the base instrument panel support structure. In previous arrangements, the retaining fastener, preferably a screw, has a pointed end portion which protrudes through the cover plate. During assembly where the maximum spacing between cover plate and base instrument member is limited, the pointed end portion interfers with the aforesaid sliding motion of the cover plate member over the base structure and can prevent moving the cover plate member into the desired assembly position. In addition to interferring with a necessary assembly movement, the fastener's protruding end portion risks damaging adjacent components during assembly.

SUMMARY OF THE INVENTION

In accordance with the present invention, the cover plate member has a thickened boss portion with an internally threaded passage extending therethrough for receiving the fastener. This boss portion and passage is designed to be of sufficient length so that the fastener is adequately retained with its pointed end portion still within the thickness of the cover plate. After assembly by a sliding movement of the cover plate member over a support structure or instrument panel base, the fastener is axially advanced from the above described pre-assembly position to an assembled position in which the end portion threadedly engages the underlying support or base instrument panel.

Preferably the fasttener's shank has both a threaded end portion and an unthreaded mid-portion. In the pre-assembly position, the threaded portion is engaged in the thickened boss of the cover plate member. In an assembled or advanced position of the fastener, the fastener's unthreaded mid-portion is disposed within the cover plate's passage free of any threaded engagement therewith and the threaded end portion is disposed outside of the passage and in threaded engagement with a support structure.

Preferably the plate has a thickened portion forming the boss, and the internally threaded passage is formed in the boss. The underlying structure may be an instrument panel and may have a C-clip threadedly engaged with the threaded outer end portion of the fastener in the advanced position thereof.

One object of this invention is to provide a captured fastener assembly having the foregoing features and capabilities.

Another object is to provide a captured fastener assembly which is composed of a relatively few simple parts and is capable of being inexpensively manufactured and easily assembled.

These and other objects, features and advantages of the invention will become more apparent as the following description proceeds, especially when considered with the accompanying drawings.

BRIEF DESCRIPTION OF THE DRAWINGS

FIG. 1 is an exploded perspective view showing a cover plate and captured fastener separated from an instrument panel to which the cover plate is to be attached by overlying sliding movement along the instrument panel support structure in the direction of the indicating arrow.

FIG. 2 is a sectional view taken on the line 2—2 in FIG. 1, but showing the cover plate separated from the instrument panel.

DETAILED DESCRIPTION OF THE PREFERRED EMBODIMENT

Figure 3:
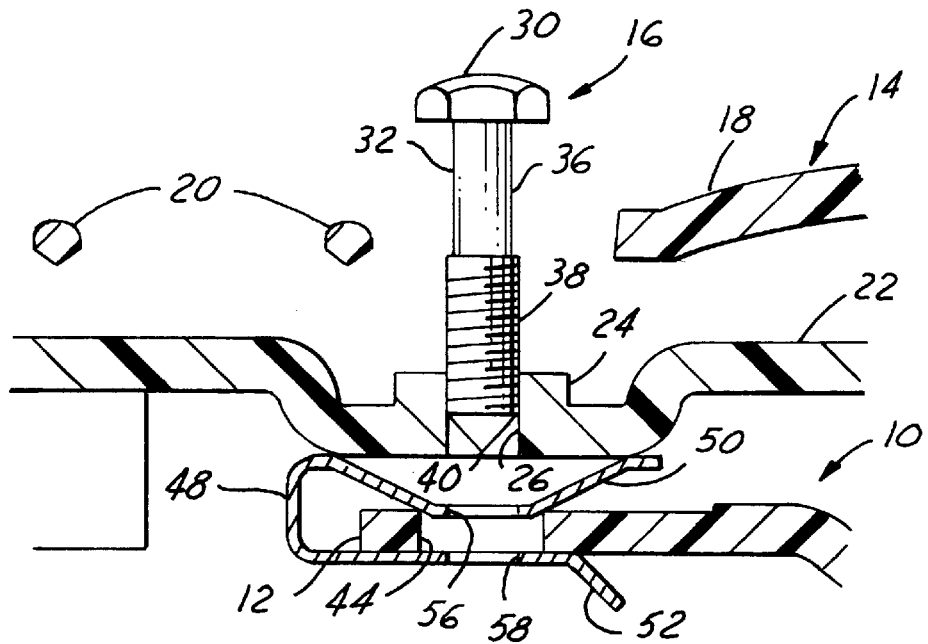
FIG. 3 is a fragmentary sectional view of the cover plate and instrument panel, with the captured fastener in its retracted position.

Referring now more particularly to FIG. 1, there is shown an instrument panel 10 having an opening 12 which may be an outlet for defrost airflow, and a cover plate member 14 adapted to be moved into an overlying assembled position with respect to the instrument panel 10.

The cover plate 14 is secured to the instrument panel by at least one fastener 16, preferably in the form of a screw as shown in FIG. 2. The cover plate 14 has an outer portion 18 provided with an opening defining an open "mesh" formed by spaced ribs 20. The cover plate 14 also has an inner portion 22 secured to the outer portion 18. The inner portion 22 is of a predetermined thickness and is formed with a thickened, integral boss 24. The boss 24 has an internally threaded passage 26 extending therethrough.

The fastener or screw 16 has a head 30 and an elongated shank 32 portion extending from the head. The shank has an unthreaded or smooth cylindrical inner or mid-portion 36 and a threaded outer end portion 38 terminating in a pointed end or tip 40.

Figure 4:
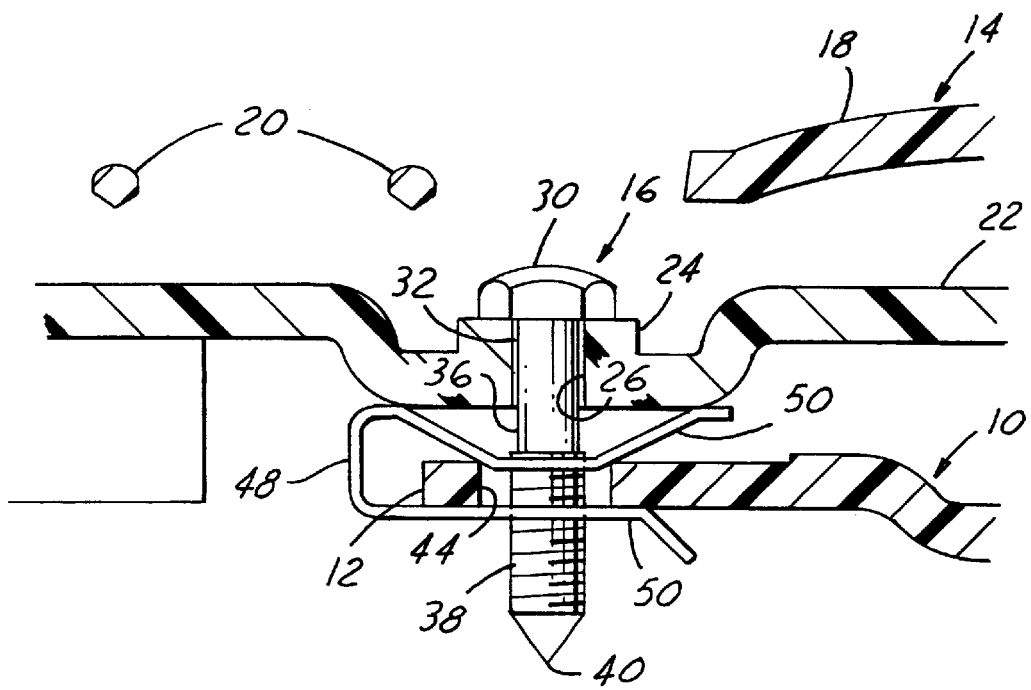
FIG. 4 is a view similar to FIG. 3 but shows the fastener fully advanced an threadly engaged with a C-clip carried by the instrument panel, effectively securing the cover plate to the instrument panel.

As best understood by examining FIGS. 3 and 4, the instrument panel or support structure 10 has an enlarged opening 44 aligned with the threaded passage 26 of boss 24 in the cover plate14. A C-clip 48 is snapped over the instrument panel or base 10 with its legs 50 and 52 clamped against opposite surfaces of the instrument panel across the opening 44. The legs of the clip 48 have aligned holes 56 and 58 with flanged edges adapted for threaded engagement with the thread on the end portion 38 of the fastener 16.

FIG. 3 shows the fastener 16 in its pre-assembly retracted position in which its threaded end portion 38 is engaged in, and thus captured in, the internally threaded passage 26 of inner plate portion 22 of the cover plate 14. In this position, the fastener's end or tip 40 is entirely captured within the internally threaded passage 26 and does not project beyond the bottom surface of the inner plate portion 22. Thus, the tip cannot interfer with other structures curing the sliding assembly movement of the cover plate member nor can it damage other components. The thickened boss makes it possible to lengthen the threaded passage so that sufficient threads of the fastener 16 are engaged without the tip being uncovered or exposed.

FIG. 4 shows the fastener 16 in its assembled or advanced position in which the fastener is axially advanced so that its head portion 30 abuts boss 24 and the threaded end portion 38 thereof threadably engages the legs 50, 52 of the C-clip 48. The fastener 16 can be advanced by a wrench or the like applied to head 30 to rotate the fastener. In this assembled position, the unthreaded mid-portion of the fastener extends within the threaded passage 26 in the boss, but is free of any threaded engagement therewith, while the threaded outer end portion 38 of the fastener is entirely outside of the threaded passage formed in the boss 24. By tightening the fastener, the cover plate 14 is drawn down firmly and securely fastened to the instrument panel 10.

What is claimed is:

1. A captured fastener assembly adapted to be attached to an underlying panel structure comprising:

a plate having a predetermined thickness and formed with a boss of greater thickness, and having an internally threaded passage being formed in said boss;

a fastener including an elongated shank extending axially within said passage and having an unthreaded inner end portion, a threaded outer end portion, and with the outer end portion of said fastener terminating in a tip end;

said fastener being capable of being axially advanced by rotation from a retracted position in which its threaded outer end portion threadedly engages said internal threaded passage in said plate and said tip end of said outer end portion is completely housed in said passage and does not project beyond said plate which otherwise would pose a potential source of damage to another part to an advanced position in which its threaded uter end portion is disposed outside of said passage and threadedly engages the underlying structure while its unthreaded inner end portion is disposed within said passage free of threaded engagement with said plate; and a clip carried by the underlying panel and adapted to threadedly receive said threaded outer end portion of said fastener as said fastener moves into its advanced position.

2. A captured fastener assembly adapted to be attached to an underlying instrument panel structure comprising:

a plastic cover plate of predetermined thickness formed with an integral molded boss of even greater thickness;

said boss having an internally threaded passage;

a fastener including an elongated shank extending axially within said passage and having an unthreaded inner end portion and a threaded outer end portion which terminates in a tip end;

said fastener being capable of being axially advanced by rotation from a retracted position in which its threaded outer end portion threadedly engages said internally threaded passage in said boss and the tip end is completely housed in said passage and does not project beyond said cover plate and thus cannot damage other parts or cause personal injury, to an advanced position in which its threaded outer end portion threadedly engages the underlying instrument panel structure and is completely outside said passage and said unthreaded inner end portion is disposed within said passage free of threaded engagement therewith;

a C-clip supported by a panel forming part of the underlying instrument panel structure being threadedly engaged with the threaded outer end portion of said fastener as it moves into its advanced position.

* * * * *